UNITED STATES PATENT OFFICE.

ALBION J. WADHAMS, OF RIVERTON, NEW JERSEY, AND ROBERT C. STANLEY, OF NEW BRIGHTON, NEW YORK, ASSIGNORS TO INTERNATIONAL NICKEL COMPANY, OF BAYONNE, NEW JERSEY, A CORPORATION OF NEW JERSEY.

ART OF SEPARATING METALS FROM MATTE.

No. 900,453.   Specification of Letters Patent.   Patented Oct. 6, 1908.

Application filed February 16, 1907. Serial No. 357,719.

*To all whom it may concern:*

Be it known that we, ALBION J. WADHAMS, of Riverton, county of Burlington, and State of New Jersey, and ROBERT C. STANLEY, of New Brighton, county of Richmond, and State of New York, have invented an Improvement in the Art of Separating Metals from Matte, of which the following is a specification.

The purpose of our invention is to provide a cheap and effective means for the separation of copper, nickel, cobalt and silver from arsenic and other elements with which they are associated in speiss or other arsenical matte, and to separate silver from the copper, cobalt, nickel and iron. The processes heretofore employed for this purpose have been difficult and to a large extent wasteful, but our process reduces the cost to a very small amount and provides means by which the values are recovered with little or no waste.

Our invention is applicable to matte containing nickel, cobalt, silver and iron, whether copper is contained therein or not.

We first eliminate the arsenic from the other metals of the speiss. This we accomplish preferably by roasting the speiss or concentrate in a calcining furnace at a cherry red heat until arsenical fumes cease to be liberated therefrom. We then take the calcined material, grind it with carbon preferably in the form of coal or charcoal, and roast the mixture in a reducing atmosphere, which reduces the arsenical compounds into arsenids, and we then subject the mixture to an oxidizing roast, which liberates arsenic fumes. The alternate reduction and oxidation are repeated in this manner until fumes of arsenic cease to be liberated. If this operation is carried to the limit, material which originally contained 35 per cent. arsenic, 16 per cent. nickel, 25 per cent. cobalt, and 10 per cent. iron, will contain about 4 per cent. of arsenic. We then take this material and grind it in a suitable mill, say to about 80 mesh, and then treat it with sulfuric acid, preferably of about 35° B. in a lead or copper-lined vessel and at a boiling temperature. By this means we dissolve a large proportion of the silver and some of the copper, nickel and cobalt. We then remove silver from this solution by passing it over copper shot or copper sheets, upon which the silver will deposit by cementing and the silver cement may then be washed, dried and smelted. The solution from which the silver has thus been removed, is neutralized with an alkali, preferably caustic soda, and evaporated, preferably to about 40° B., which causes the precipitation of the nickel and cobalt as crystalline sulfates. The crystals are then calcined, and thus brought to the condition of oxids, which we then dissolve in hydrochloric acid, and the solution is freed from iron by precipitation with lime, leaving a solution which contains chlorid of copper, nickel and cobalt and also a small proportion of silver chlorid which is not completely eliminated by the best practice in cementing. The residual silver is removed from the solution by precipitation with hydrogen sulfid, and the nickel and cobalt can then be separated by known methods.

Instead of treating the sulfate solution in the manner above described, it can be taken directly to wooden tanks, the iron oxidized and preciptiated therefrom by the addition of sodium oxychlorid, and the silver then precipitated by means of hydrogen sulfid. The process can then be continued for the separation of nickel and cobalt by known methods.

We claim:

1. The method herein described of separating metals, which consists in removing arsenic from speiss containing cobalt, nickel, silver and iron, dissolving the material with sulfuric acid, and then partially removing silver therefrom; substantially as described.

2. The method herein described of separating metals, which consists in removing arsenic from speiss containing cobalt, nickel, silver and iron, dissolving the material with sulfuric acid, and then partially removing silver therefrom by cementing on a metal; substantially as described.

3. The method herein described of separating metals, which consists in removing arsenic from speiss containing cobalt, nickel, silver and iron, dissolving the material with sulfuric acid, then partially removing silver from the solution, precipitating the nickel and cobalt from the solution as sulfates, calcining the sulfates to form oxids, dissolving the oxids in hydrochloric acid, and separating iron from the solution; substantially as described.

4. The method herein described of separating metals, which consists in removing arsenic from speiss containing cobalt, nickel, sulfur and iron, treating the material with sulfuric acid, dissolving the metals therein, then partially removing silver from the solution, precipitating nickel and cobalt from the solution as sulfates, calcining the sulfates to form oxids, dissolving the oxids in hydrochloric acid, separating iron from the solution, and then separating the residue of silver from the solution; substantially as described.

In testimony whereof, we have hereunto set our hands.

ALBION J. WADHAMS.
ROBT. C. STANLEY.

Witnesses:
GEORGE H. SONNEBORN,
ANNA E. WALLACE.